LINE INSULATION TESTING IN TELEPHONE SYSTEMS

Filed Dec. 23, 1959

INVENTORS R. W. AMORY
T. N. LOWRY
BY
S. E. Hollander
ATTORNEY

United States Patent Office
3,121,775
Patented Feb. 18, 1964

3,121,775
LINE INSULATION TESTING IN TELEPHONE SYSTEMS

Robert W. Amory, Cranford, and Terrell N. Lowry, Boonton, N.J., assignors to Bell Telephone Laboratories, Incorporated, New York, N.Y., a corporation of New York Filed Dec. 23, 1959, Ser. No. 861,608
7 Claims. (Cl. 179—175.2)

Figure 1:
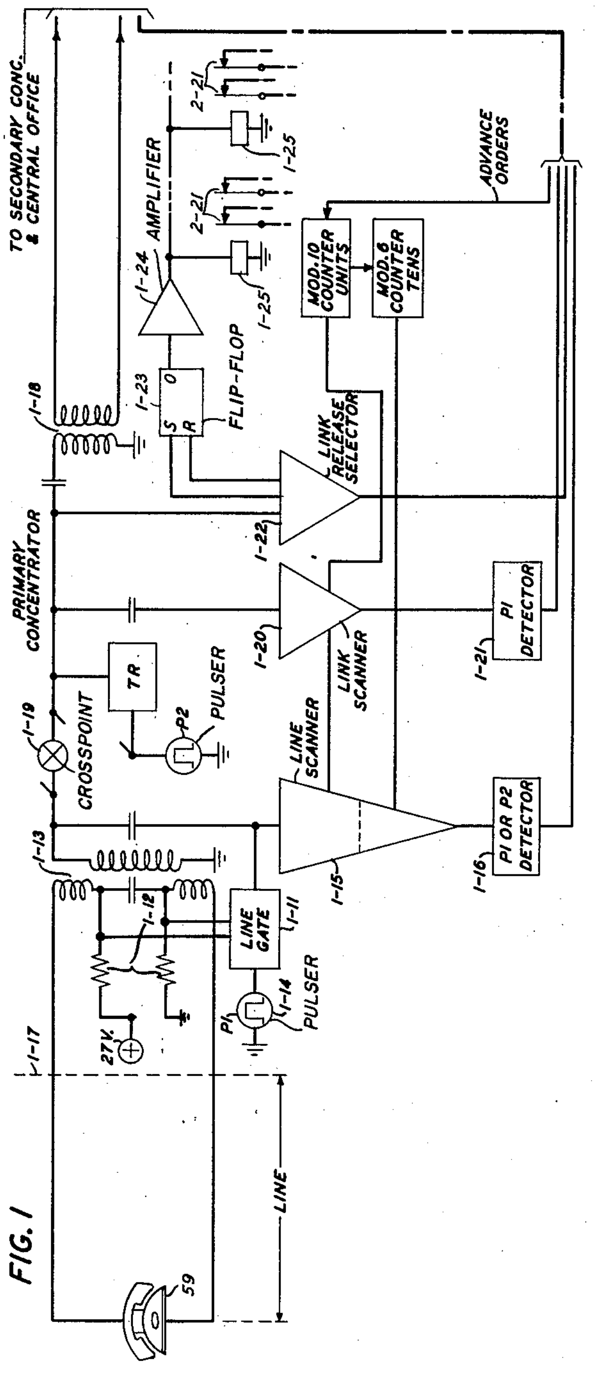

This invention relates to automatic telephone switching systems and more particularly to the testing of line insulation in telephone circuits.

A key factor in the successful operation of any automatic telephone system is the maintenance of the insulation resistance of a customer telephone line within tolerable limits. If the resistance departs appreciably from design limits, dial pulses may be deformed and the dialed number registered incorrectly at the central office. Moreover, problems will be presented in ringing the telephone of the subscriber since the ringing may be prematurely "tripped" by a relay in the central office which is operated by the additional current that flows through the insulation. Still other difficulties attach to the decrease of insulation resistance below design specifications including the generation of noise which affects speech, and "permanent signals" which result from the operation of relays at the central office due to the low resistance in the circuit.

The causes of low insulation resistance are manifold and include cable sheath cracks, tree branch contacts with open wires, damaged drop wires, etc.

Thus, some arrangement for checking insulation resistance on a periodic basis in automatic telephone switching systems is essential. But one of the difficulties which inhere in the measurement of insulation resistance is that tests made during dry weather may indicate that insulation resistance of certain lines is high despite the fact that these lines have impaired insulation. The same lines may in wet weather have reduced insulation resistances by a factor of ten or more.

In the past, automatic line insulation testing has generally encompassed the measurement of line insulation by appropriate metering equipment and the determination of whether the line insulation is above or below an acceptable predetermined range.

These arrangements have proved to be completely operative and useful but in general have been designed as adjuncts to the usual telephone switching equipment rather than an integral part thereof and therefore have not relied on conventional portions of a telephone line circuit (e.g., the line relay) for resistance in performance of the test.

It would therefore seem desirable to provide an arrangement whereby the usual equipment utilized in observing the condition of the line, i.e., the service request indicating device, is also incorporated as part of the automatic line insulation testing arrangement. Under the latter circumstances, it would be possible by identification of the service requesting device to determine which lines if any are experiencing difficulty.

In the present invention a significant departure from this philosophy is employed through an arrangement which intentionly generates an admittedly spurious servive request, i.e., one entirely due to a fault condition or impaired insulation on the line. A number of decisive benefits flow from this break with the traditional concepts of inviolability of the service request facilities on a telephone line. For example, the identification of the line generating a fictitious service request is readily available through the same facilities which identify a line generating a legitimate service request. In addition, economic benefits are apparent from the dual utilization of the detecting device for service requests as a line insulation measuring arrangement.

It is therefore an object of this invention to provide for automatic line testing of subscriber lines through the utilization of conventional service request indicating equipment.

It is another object of this invention to anticipate an imminent deteriorated line resistance condition which would otherwise ultimately produce a spurious service request by deliberately provoking a concededly false service request before the deteriorated condition is reached.

It is still another object of this invention to provide for the generation of a concededly false service request on a line having impaired insulation resistance.

It is a further object of this invention to discriminate between genuine service requests and spurious service requests representing a line having a fault condition thereon.

A further object of this invention is to periodically test each line in an automatic telephone switching system to determine the line insulation resistance thereof.

Figure 2:
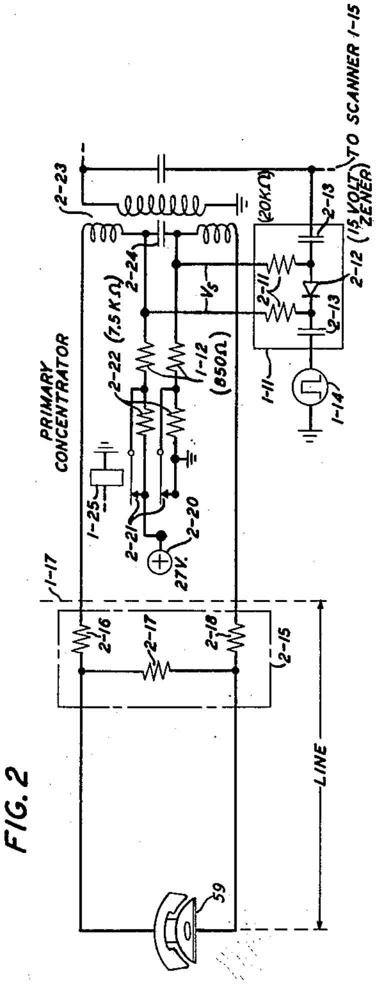

These and other objects and features of the invention may be more readily apprehended from an examination of the following specification, appended claims and attached drawing, in which:

FIG. 1 is a specific illustrative embodiment in outline form showing the incorporation of the control circuitry of the invention in combination with a line concentrator; and FIG. 2 is a detailed rendition including the shunting elements operated by the control circuitry of FIG. 1.

For illustrative purposes, the instant arrangement is described as used in conjunction with a two-stage remote line concentrator system as described in the application of Harr-Lowry-Nehama-Ridinger, Serial No. 848,595, filed October 26, 1959. For a comprehensive description of the two-stage concentrator system reference may be made to the above-referred-to application. For the purposes of comprehension of the present invention, however, it will suffice to refer to a simplified rendition of a portion of the equipment described by Harr et al. as shown in FIG. 1.

In FIG. 1 a subscriber 59 has a line connected to a remote primary concentrator unit designated to the right of dotted line 1—17. Although only one subscriber is shown, it is understood that a plurality of subscribers are advantageously connected to the same remote primary concentrator and share a lesser number of connections to a secondary concentrator (not shown) from which a number of trunks extend to the central office. As explained in Harr et al., a controlling purpose in the use of remote concentrators is to minimize copper and other outside plant costs.

It is evident from FIG. 1 that no direct metallic path exists between the subscriber and the central office in view of the alternating-current coupling between the line and the primary concentrator at transformer 1—13 and between the primary concentrator and the link at transformer 1—18. It is nevertheless essential, however, to evaluate the direct-current resistance of the line loop since despite the lack of direct-current connection between the loop and the central office it is the direct-current resistance of the subscriber's line which is utilized to determine the existence or nonexistence of the service request, i.e., whether the line is on-hook or off-hook.

For the purposes of this embodiment it may be assumed that the direct-current impedance of a line in the on-hook condition is approximately 100,000 ohms and the resistance of a line in the off-hook condition is approximately 1000 ohms. In order to distinguish between the two values, a line gate 1—11 is utilized. It is the function of this gate to discriminate between a line on-hook condition and a line off-hook condition. As explained in Harr et al. and the applications therein referred to, a line scanner shown at 1—15 repetitively examines the state condition of each of the lines in sequence. The line scanner 1—15 is apprised of a change in state by the transmission of a P1 signal from P1 source 1—14 through the energized line gate 1—11 to the line scanner 1—15. It has been conventionally assumed that the passage of a P1 signal through the line gate 1—11 connotes a line on-hook while the blocking of a P1 signal by line gate 1—11 connotes a line off-hook or service request.

Crosspoint 1—19 is symbolic of a number of other crosspoints for connecting particular lines to selected links. The link scanner 1—20 serves a function with respect to the links as line scanner 1—15 performs with regard to the lines. Detectors 1—16 and 1—21 are connected respectively to line scanner 1—15 and link scanner 1—20 to observe and temporarily record the information presented to the scanners. Link release selector 1—22 is connected to one side of crosspoint 1—19 and, as explained in Harr et al., is utilized to release or open the crosspoint under control of the central office. The link release selector may also be utilized to perform other functions and in particular to energize other equipment in the remote primary concentrator as shown in further detail herein.

In brief, when a subscriber elects to place a call and removes the receiver from the switchhook, the switchhook contacts are closed and a substantially lower resistance is observed on the line by line gate 1—11. In consequence of the arrangement of line gate 1—11, the line off-hook condition causes the gate 1—11 to block further signals from P1 pulse source 1—14. On the next cycle of line scanner 1—15 the absence of a pulse from line 59 is detected and stored in detector 1—16 which is connected to equipment in the central office by means, not shown. In response to the service request the office common control establishes a path from the service requesting line to the central office over a selected link to the secondary concentrator and a selected trunk (not shown) from the secondary concentrator to the central office. The Mod 10 and Mod 6 counters shown in FIG. 1 are explained in further detail in Harr et al. and it is sufficient for the present purpose to indicate that they are responsive to advance signals transmitted from the central office and serve to advance the line scanner 1—15 and link scanner 1—20 whereby the line scanner 1—15 sequentially connects to each of the lines in sequence and the link scanner 1—20 connects to each of the links in sequence.

From the above brief description of the format of a portion of the two-stage concentrator it is apparent that a critical factor in establishing the existence of an off-hook condition is the measurement of the impedance of the line circuit. If this impedance should vary in view of malfunction including tip to ring short circuits or leakage circuits or leakage paths to ground, etc., it is apparent that difficulty will ensue in the detection of a genuine service request. It is a function of the present invention to utilize insofar as possible the existing equipment ordinarily employed for detecting service requests and to enhance its value by adapting the equipment to perform still another and vital function of detecting incipient line failures.

FIG. 2 is an amplified rendition of a portion of the equipment shown in FIG. 1. In FIG. 2 the equipment similar to that shown in FIG. 1 is similarly designated. The line gate 1—11 of FIG. 1 is seen to include resistors 2—11, diode 2—12 and capacitors 2—13. The resistors shown as 1—12 are generally referred to as battery feed resistors and their function is to provide regulation of the current flowing in the subscriber's loop. They serve to limit the total amount of current that may be drawn by the subset.

FIG. 2 also shows a cable 2—15 which is designed to represent the impedance path between the remote primary concentrator and the substation. Thus cable 2—15 includes resistances 2—16 and 2—18 and leakage resistance 2—17, the latter representing the leakage resistance from tip to ground, ring to ground, and tip to ring. Although shown as lumped parameters it is understood that these resistances may in fact be physically distributed throughout the length of the subscriber's line or cable.

To indicate the normal direct-current conditions that obtain in the subscriber's set when the subset is on-hook and again when it is off-hook, reference may be made to FIG. 2.

In the on-hook condiiton the direct-current resistance of the subset 59 will be assumed to be in excess of 100,000 ohms. Under these conditions a small current is drawn from battery 2—20 which flows through the contacts 2—21, resistors 1—12, transformer 2—23, cable 2—15 and through the subset 59. If the leakage resistance 2—17 is very high, the effective limiting resistance in the circuit is the 100,000-ohm impedance of the subset.

It is apparent that $V_s$ which is the direct-current voltage appearing across the capacitor 2—24 is the parameter which controls the gate circuit 1—11. When voltage $V_s$ is high, i.e., 27 volts or near that value, diode 2—12 is in the reverse conducting condition, it being assumed that diode 2—12 is a Zener diode having an illustrative breakdown voltage of 15 volts. Thus diode 2—12 is a two-terminal quantizing element with a breakdown voltage of 15 volts. Above 15 volts the impedance of the diode is relatively low and below 15 volts the impedance is relatively high.

Consequently when voltage $V_s$ is at a value of 27 volts, diode 2—12 is conductive in the reverse direction. Thus when the subset is on-hook a small current flows through the customer loop, voltage $V_s$ approaches 27 volts and the voltage across Zener diode 2—12 is approximately 15 volts. Under these circumstances pulses from source 1—14 traverse diode 2—12 and enter line scanner 1—15 where they are interpreted as an on-hook condition.

When the subscriber lifts the receiver from the cradle and the subset is in the off-hook condition, a substantially lower impedance is presented by the subset in the range of approximately 500 ohms. In view of the increased current flow through the subset and line the voltage across resistances 1—12 is increased so that the voltage $V_s$ drops to approximately 10 volts. Since this voltage is below the breakdown voltage of Zener diode 2—12, that diode is rendered nonconducting and pulses from source P1 are no longer able to traverse diodes 2—12 and fail to enter the scanner 1—15. Through the mechanism of the scanner the absence of P1 pulse signals indicates a service request on line 59; an indication is made to the central office from the detector 1—16, and apparatus is energized to effect a connection to the service requesting line, all as described in Harr et al. supra.

It will be noted in the above illustrations that the leakage resistance 2—17 is assumed to be infinite. In the case of the off-hook condition the cable resistance was assumed to be approximately 250 ohms for resistors 2—16 and 2—18. Thus the total direct-current resistance of the subset which is approximately 500 ohms and the cable resistance which is approximately 500 ohms in addition to resistors 1—12 complete a total of 2.7K ohms.

Thus far the description has related to conventional operation of the service detecting equipment. It will be noted from an examination of the above that all of the equipment illustrated in FIGS. 1 and 2 are also set forth in the two-stage concentrator of Harr et al. with the exception of contacts 2—21 and resistors 2—22, and the equipment for operating relays 1—25.

In order to implement a line insulation test in accordance with the present invention a particular maintenance code as described in Harr et al. supra is transmitted to actuate the link release selector 1—22 selecting a particular output conductor therefrom. This conductor is connected to the set input of an insulation test flip-flop 1—23 which in turn activates a transistor amplifier 1—24 to actuate relays 1—25 which operate contacts 2—21, there being one relay 1—25 with a pair of contacts 2—21 for each line circuit in the primary concentrator.

When contacts 2—21 are energized, resistances 2—22 are placed in the circuit and the resistance in series with the subset is increased appreciably. In view of the additional series resistance the voltage $V_s$ is now proportional to the ratio between the resistance of the cable (particularly the leakage resistance) and the resistors 2—22 and 1—12. Since the subset is assumed to be on-hook during the line insulation test it may be disregarded so far as its on-hook impedance (100,000 ohms) is concerned, as may resistors 2—16 and 2—18 (500 ohms).

Assuming that the resistance of the leakage path 2—17 is approximately equal to 16.7K ohms (the sum of resistors 2—22 and 1—12) the voltage drop $V_s$ will be approximately one-half of the voltage of battery 2—20 or 13.5 volts. This voltage is inadequate to render diode 2—12 conducting and pulses from source 1—14 are blocked from entering the scanner which, as discussed above, interprets the absence of pulses as a service request and a record is made thereof in the central office as explained in Harr et al. Since the subset is on-hook this service request is manifestly false and reflects only the deterioration of the insulation of the cable to a point where the leakage resistance 2—17 in combination with the additional resistors 2—22 inserted in the line circuit lower the voltage $V_s$ below a value which will render diode 2—12 conducting.

If the leakage resistance is substantially high, e.g., in the order of 30K ohms or more, the voltage drop across $V_s$ which is proportional to the ratio of the sum of resistors 2—22 and 1—12 to the value of the cable resistance is now significantly higher than 15 volts and diode 2—12 is energized in the reverse conduction direction to permit pulses from source 1—14 to enter the scanner thereby indicating an on-hook condition, or, for the purposes of the line insulation test, a satisfactory cable resistance condition.

It may be observed, at this juncture, that a distinct advantage of the present invention is the ability to anticipate or foretell line failures before the line has deteriorated sufficiently to simulate an off-hook condition in consequence of the lowered leakage resistance alone.

After a full cycle of the scanner in which all of the lines have been tested, another maintenance code is transmitted from the central office to the output conductor of link release selector 1—22 connected to the "reset" input thereby resetting insulation test flip-flop 1—23 and removing the input from transistor amplifier 1—24 which releases relay 1—25. Contacts 2—21 return to the rest position and once more shunt resistors 2—22. The circuit is now returned to normal and scanning is resumed. If in the next succeeding cycle a service request indication is presented on a line previously assumed during the line insulation test to have delivered a false service request, it is concluded that the previous false service request was actually a line off-hook and the recording of the "false" service request is deleted. However, if no additional service request is repeated during the next succeeding scan cycle the previous false service request is assumed to have reflected an incipient failure condition on the associated line and the record made thereof is utilized to alert maintenance personnel.

Since the voltage $V_s$ is proportional to the ratio of resistors 2—22 plus resistors 1—12 (16.7K ohms) and the cable resistance, it will be seen that a cable resistance exceeding approximately 20.9K ohms will produce a voltage drop $V_s$ exceeding 15 volts and will therefore test "satisfactory." Lower cable resistances will simulate false service requests.

To preserve clarity in the above illustration it has been assumed that the interrogation pulse from source P1 is of insufficient amplitude to affect the conductivity of the diode and that the threshold sensitivity of the detector 1—16 is designed to permit response to this order of signal magnitude. It will be appreciated by those skilled in the art that for different amplitudes of the interrogating signal and a different threshold response of the detector, the limits for the circuit line insulation test will also accordingly be different.

It is to be understood that the above-described arrangements are illustrative of the application of the principles of this invention. Numerous other arrangements may be devised by those skilled in the art without departing from the spirit and scope of the invention.

What is claimed is:

1. A telephone line insulation test circuit including a telephone line having leakage resistance, a substation connected to said line, a current source connected to said line, a gating device connected to said line, means for rendering said gating device nonconductive in response to an off-hook condition at said substation representing a normal service request on said line, and means for connecting an impedance in series with said source during an on-hook condition on said line to control said device to be nonconductive during said on-hook condition on said line to stimulate a service request if the leakage resistance of said line is less than a predetermined value.

2. An automatic telephone line insulation test circuit comprising a telephone line, battery feed means connected to said line, a substation connected to said line, service request indicating means normally responsive to an off-hook condition at said substation connected to said line, impedance means connected in series with said battery feed means, means conected in shunt with said impedance means for normally by-passing said impedance means, and means for opening said shunting means to effectively insert said impedance means in series with said battery feed means during an on-hook condition on said line, said insertion of said impedance means being adapted to simulate an off-hook condition on said line to operate said service request indicating means during said on-hook condition on said line if the leakage resistance of said line is less than a predetermined value.

3. An automatic telephone line insulation test circuit including a telephone line having leakage resistance, service request indicating means connected to said line and normally responsive to an off-hook condition on said line, battery feed means connected to said line, impedance means connected in series with said battery feed means, shunting means including relay contact means for normally short-circuiting said impedance means, and means for actuating said relay contact means during an on-hook condition on said line to remove said short circuit and effectively insert said impedance means in series with said battery feed means, said insertion of said impedance means being effective to simulate an off-hook condition and to actuate said service request indicating means during said on-hook condition on said line if the leakage resistance of said line is less than a predetermined value.

4. A telephone line insulation test circuit including a telephone line having leakage resistance, a current source connected to said line, a substation connected to said line, a unilaterally conducting device connected to said line, biasing means for biasing said device nonconductive in response to an off-hook condition at said substation representing a service request on said line, a scanner connected to said unilaterally conducting device for observing the service condition of said line, impedance means, and means for inserting said impedance means in series with said current source during an on-hook condition on said line to control said device to be nonconductive during said on-hook condition on said line for indicating a false service request to said scanner if said leakage resistance is less than a predetermined value.

5. An automatic line insulation test circuit comprising a telephone line having leakage resistance, service request indicating means connected to said line and normally responsive to an off-hook condition on said line, a source of potential connected to said line, first impedance means connected in series with said line, second impedance means connected in series with said line, relay means for normally short-circuiting said second impedance means, and means for actuating said relay means during an on-hook condition on said line to remove said short circuit and insert said second impedance means in series with said source of potential for operating said service request indicating means during said on-hook condition on said line if said leakage resistance is less than a predetermined value.

6. An automatic line insulation test circuit in accordance with claim 5 wherein said service request indicating means includes an asymmetrically conducting device.

7. A telephone line insulation test circuit for use in a concentrator system including a substation, a primary concentrator, a line having leakage resistance joining said substation to said primary concentrator, a current source connected to said line, a link joining said concentrator to a central office, a line scanner sequentially connectable to said line and adapted to observe the service condition of said line and to transmit indications thereof to said central office, a link scanner sequentially connectable to said link for observing the service condition thereof and for transmitting indications thereof to said central office, a link release selector connectable to said link, service request indicating means normally responsive to an off-hook condition on said line, impedance means, means for inserting said impedance means in series with said current source at said primary concentrator during an on-hook condition on said line, said insertion of said impedance means being effective to simulate an off-hook condition to actuate said line scanner and service request indicating means during said on-hook condition on said line if said leakage resistance is less than a predetermined value, and means for actuating said means for inserting said impedance means in series with said current source.

References Cited in the file of this patent

UNITED STATES PATENTS

| | | |
|---|---|---|
| 2,093,242 | Humphries | Sept. 14, 1937 |
| 2,409,145 | Morris | Oct. 8, 1946 |
| 2,979,574 | Lowry | Apr. 11, 1961 |